(12) United States Patent
Sun et al.

(10) Patent No.: US 11,555,151 B2
(45) Date of Patent: Jan. 17, 2023

(54) LIQUID CRYSTAL COMPOSITION, LIQUID CRYSTAL DISPLAY ELEMENT AND LIQUID CRYSTAL DISPLAY

(71) Applicant: Shijiazhuang Chengzhi Yonghua Display Material Co., Ltd., Hebei (CN)

(72) Inventors: Xuanfei Sun, Hebei (CN); Sumin Kang, Hebei (CN); Gang Wen, Hebei (CN); Qing Cui, Hebei (CN); Hongru Gao, Hebei (CN); Jikai Li, Hebei (CN); YanLi Dong, Hebei (CN)

(73) Assignee: SHIJIAZHUANG CHENGZHI YONGHUA DISPLAY MATERIAL CO., LTD., Hebei (CN)

( * ) Notice: Subject to any disclaimer, the term of this patent is extended or adjusted under 35 U.S.C. 154(b) by 0 days.

(21) Appl. No.: 17/251,620

(22) PCT Filed: Apr. 3, 2020

(86) PCT No.: PCT/CN2020/083216
§ 371 (c)(1),
(2) Date: Dec. 11, 2020

(87) PCT Pub. No.: WO2021/134962
PCT Pub. Date: Jul. 8, 2021

(65) Prior Publication Data
US 2021/0292650 A1  Sep. 23, 2021

(30) Foreign Application Priority Data
Dec. 30, 2019 (CN) .......................... 201911394886.1

(51) Int. Cl.
*C09K 19/30* (2006.01)
*C09K 19/54* (2006.01)
*C09K 19/04* (2006.01)

(52) U.S. Cl.
CPC ........ *C09K 19/3003* (2013.01); *C09K 19/542* (2013.01); *C09K 2019/0448* (2013.01); *C09K 2019/301* (2013.01); *C09K 2019/3004* (2013.01); *C09K 2019/3009* (2013.01); *C09K 2019/3016* (2013.01)

(58) Field of Classification Search
CPC ................................................... C09K 19/30
See application file for complete search history.

(56) References Cited

U.S. PATENT DOCUMENTS

2016/0244668 A1* 8/2016 Saito ................ C09K 19/3098
2017/0298276 A1* 10/2017 Saito ................ C09K 19/3003
2019/0048261 A1* 2/2019 Kurihara .................. G02F 1/13
2020/0239776 A1* 7/2020 Kang ................ C09K 19/062

FOREIGN PATENT DOCUMENTS

| CN | 105121597 A | 12/2015 |
| CN | 107849454 A | 3/2018 |
| CN | 109988582 A | 7/2019 |
| CN | 110016353 A | 7/2019 |
| CN | 110577832 A | 12/2019 |

* cited by examiner

Primary Examiner — Chanceity N Robinson
(74) Attorney, Agent, or Firm — Muncy, Geissler, Olds & Lowe, P.C.

(57) ABSTRACT

A liquid crystal composition, a liquid crystal display element and a liquid crystal display comprising the liquid crystal composition belong to the field of liquid crystal display. The liquid crystal composition comprises a compound represented by formula I with a mass content of 1-10% as the first component, a compound represented by formula II with a mass content of 1-20% as the second component, more than two compounds represented by formula III as the third component, more than three compounds represented by formula IV as the fourth component, and one or more polymerizable compounds as the fifth component, the crystal composition has low rotational viscosity and low $\gamma_1/K_{33}$ on the basis of maintaining appropriate optical anisotropy. When applied to liquid crystal display elements or liquid crystal displays, the liquid crystal display has a fast response speed.

5 Claims, No Drawings

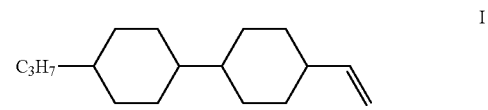

I

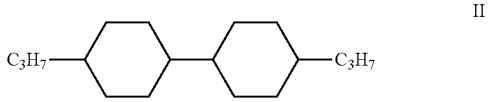

II

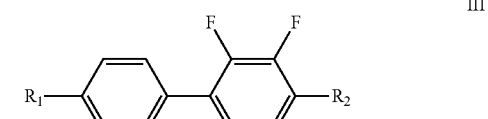

III

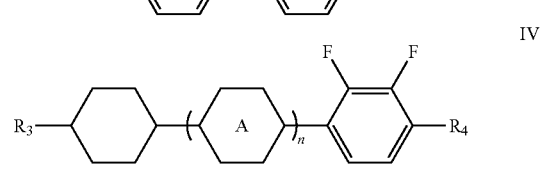

IV

LIQUID CRYSTAL COMPOSITION, LIQUID CRYSTAL DISPLAY ELEMENT AND LIQUID CRYSTAL DISPLAY

TECHNICAL FIELD

The present invention relates to the field of liquid crystal display, in particular to a liquid crystal composition and a liquid crystal display element or liquid crystal display containing the liquid crystal composition.

BACKGROUND ART

According to the display mode, LCD can be divided into the following modes: twisted nematic (TN) mode, super twisted nematic (STN) mode, coplanar mode (IPS), vertical alignment (VA) mode. The liquid crystal composition is required to have the following characteristics regardless of the display mode:
(1) stable chemical and physical properties; (2) low viscosity; (3) suitable dielectric $\Delta\varepsilon$; (4) suitable refractive index $\Delta n$; (5) good miscibility with other liquid crystal compounds.

Early commercial TFT-LCD products basically adopt TN display mode, and its biggest problem is narrow viewing angle. With the increase of product size, especially in the field of TV, IPS display mode and VA display mode with wide view angle are developed and applied in turn.

However, the liquid crystal medium used in the display elements of FFS mode, IPS mode and VA mode is not perfect. For the liquid crystal materials used in the display devices, it is required to have ① low driving voltage: the liquid crystal material has appropriate negative dielectric anisotropy and elastic coefficient K; ② fast response: the liquid crystal material has appropriate rotational viscosity $\gamma_1$ and elastic coefficient K; ③ high reliability: high charge retention, high specific resistance, excellent high temperature stability and strict requirements for the stability of UV light or conventional backlight lighting. With the development of LCD (liquid crystal display) technology, the response speed of LCD products is required to be higher and higher. The response speed of liquid crystal materials in the prior art is limited by the rotational viscosity $\gamma_1$/elastic constant K of liquid crystals. Therefore, in order to achieve rapid response, it is necessary to try every means to reduce the rotational viscosity $\gamma_1$ of liquid crystal materials and increase its elastic constant K. However, it is found that the rotational viscosity and the elastic constant are closely related parameters. When the rotational viscosity is reduced, the elastic constant will decrease, so the response time can not be reduced.

At present, the liquid crystal composition with excellent response speed and various poor displays is still expected to be obtained. Especially in VA mode and other modes, the liquid crystal medium used in the display element is negative dielectric anisotropy. Compared with the liquid crystal medium with positive dielectric anisotropy, it has the disadvantages of smaller dielectric, slower response time and higher driving voltage. Therefore, it is desirable to obtain a negative dielectric anisotropy liquid crystal medium with an improved response time.

SUMMARY OF THE INVENTION

In order to solve at least one problem existing in the prior art, the object of the present invention is to provide a liquid crystal composition with negative dielectric anisotropy, which has higher optical anisotropy and lower $\gamma_1/K_{33}$, so as to have improved response time, thereby improving response speed and improving display quality when applied to display devices.

To achieve the above purpose, the present disclosure adopts the following technical solutions:

A liquid crystal composition with negative dielectric anisotropy is provided, which comprises:
a compound represented by formula I with a mass content of 1-10% as the first component;
a compound represented by formula II with mass content of 1-20% as the second component;
more than two compounds represented by formula III as the third component;
more than three compounds represented by formula IV as the fourth component; and,
one or more polymerizable compounds as the fifth component,

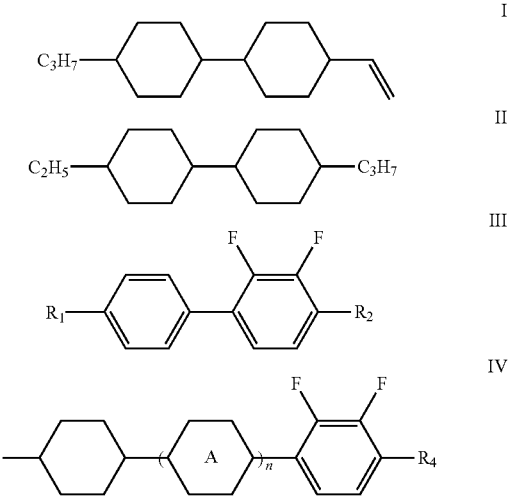

wherein,
$R_1$, $R_2$, $R_3$ and $R_4$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8, and any one —CH$_2$— or several —CH$_2$— that are not adjacent of the groups indicated by $R_1$, $R_2$, $R_3$ and $R_4$ are selectively substituted by cyclopentyl, cyclobutyl or cyclopropyl;

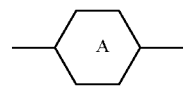

represents 1,4-cyclohexylidene or 1,4-Phenylene;
n represents 0 or 1.

The present disclosure also provides a liquid crystal display element or liquid crystal display, which comprises a liquid crystal composition of the present disclosure. The liquid crystal display element is an active matrix addressable display element or a liquid crystal display or a passive matrix addressing display element or a liquid crystal display.

Effect of Invention

Compared with the prior art, the liquid crystal composition of the present disclosure has lower rotational viscosity ($\gamma_1$) and low $\gamma_1/K_{33}$ on the basis of maintaining appropriate optical anisotropy ($\Delta n$), and the liquid crystal display element or liquid crystal display apparatus containing the liquid crystal composition of the present disclosure has a faster response speed.

DETAILED DESCRIPTION OF EMBODIMENTS

[Liquid Crystal Composition]

In one aspect, the liquid crystal composition of the present disclosure comprises: a compound represented by formula I with a mass content of 1-10% as the first component and a compound represented by formula II with a mass content of 1-20% as the second component, more than two compounds represented by formula III as the third component, more than three compounds represented by formula IV as the fourth component and one or more polymerizable compounds as the fifth component,

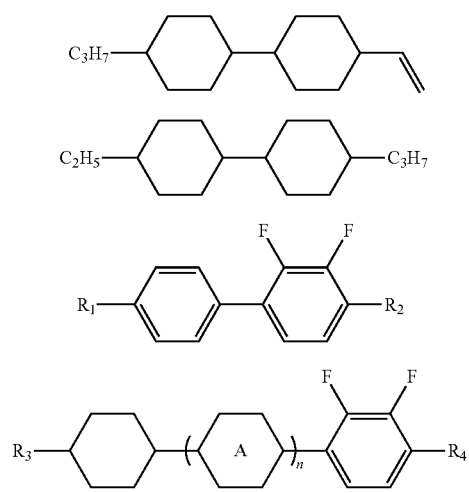

wherein, $R_1$, $R_2$, $R_3$ and $R_4$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8, and any one —$CH_2$— or several —$CH_2$— that are not adjacent of the groups indicated by $R_1$, $R_2$, $R_3$ and $R_4$ are selectively substituted by cyclopentyl, cyclobutyl or cyclopropyl;

represents 1,4-cyclohexylidene or 1,4-Phenylene;
n represents 0 or 1.

For example, methyl, ethyl, n-propyl, isopropyl, n-butyl, isobutyl, tert butyl, n-amyl, isoamyl, hexyl, heptyl, octyl, nonyl, decyl, etc. can be listed as the alkyl groups with carbon atom number of 1-10.

For example, methoxy, ethoxy, n-propoxy, isopropoxy, n-butoxy, isobutoxy, pentoxy, hexoxy, hepthoxy, octyloxy, nonoxy, decaoxy, etc. can be listed as the alkoxy groups with the carbon atom number of 1~10.

For example, vinyl, 1-propenyl, 1-butenyl, 2-butenyl, 3-butenyl, 1-pentenyl, 2-pentenyl, 3-butenyl, 1-pentenyl, 2-pentenyl, 3-pentenyl, 4-Pentenyl, 1-hexenyl, 2-hexenyl, 3-Hexenyl, etc., can be listed as Alkenyl with carbon atom number of 2~10.

For example, cyclopentyl, cyclobutyl, cyclopropyl, methylcyclopentyl, methylcyclobutyl, methylcyclopentyl, etc. can be listed as a group obtained by substituted any one —CH2- or several —CH2- that are not adjacent of the alkyl groups with carbon atom numbers from 1 to 10 by cyclopentyl, cyclobutyl or cyclopropyl.

In one embodiment of the liquid crystal composition of the present disclosure, the compounds represented by formula III are preferably selected from the group consisting of compounds represented by formula III-1~III-7:

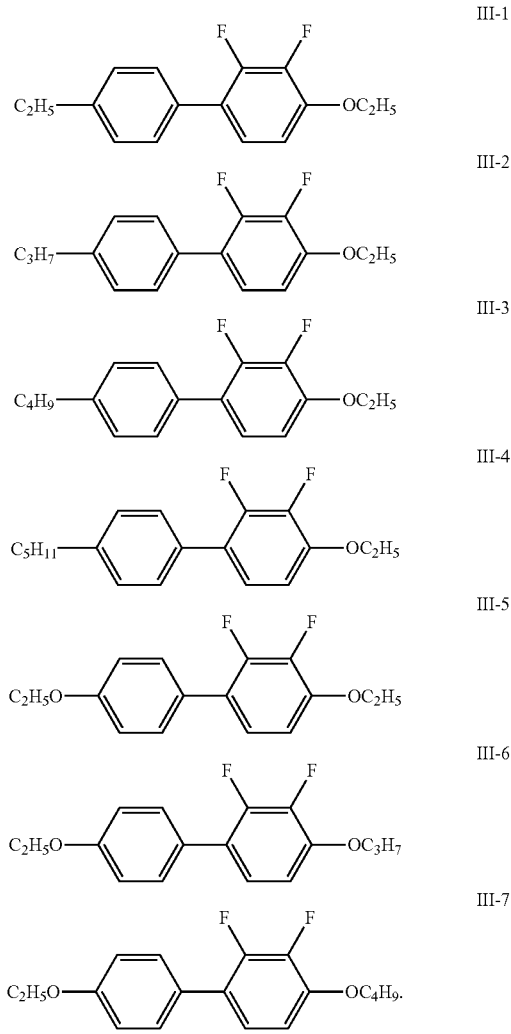

In another embodiment of the liquid crystal composition of the present disclosure, the compounds represented by formula IV are preferably selected from the group consisting of compounds represented by formula IV-1~IV-9:

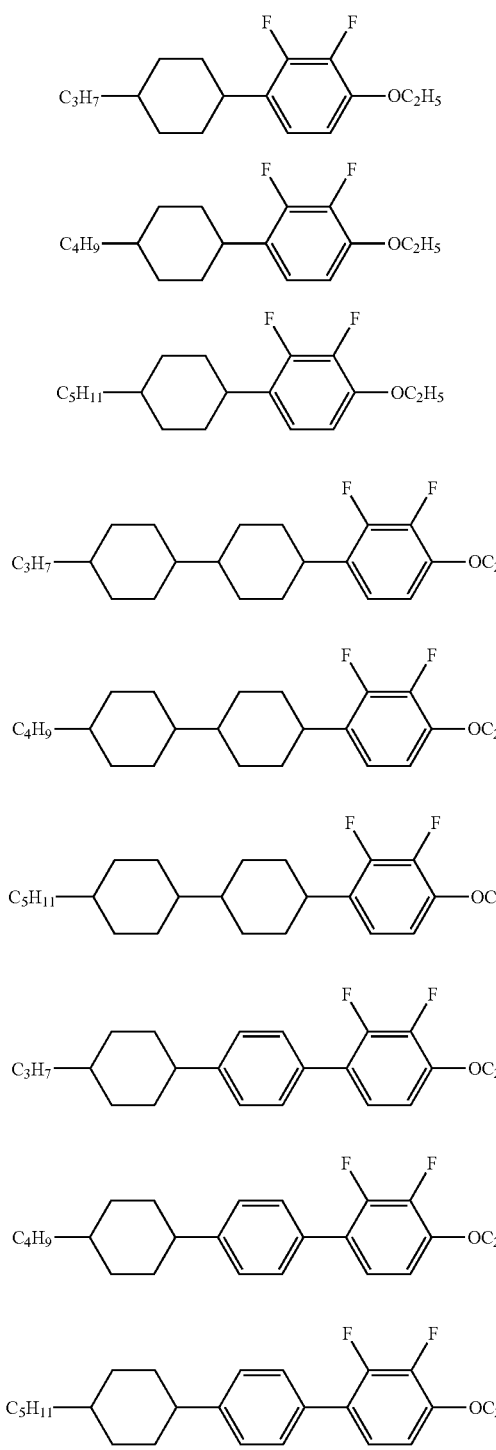

In another embodiment of the liquid crystal composition of the present disclosure, the polymerizable compound is preferably selected from the group consisting of formulas RM-1 to rm-8:

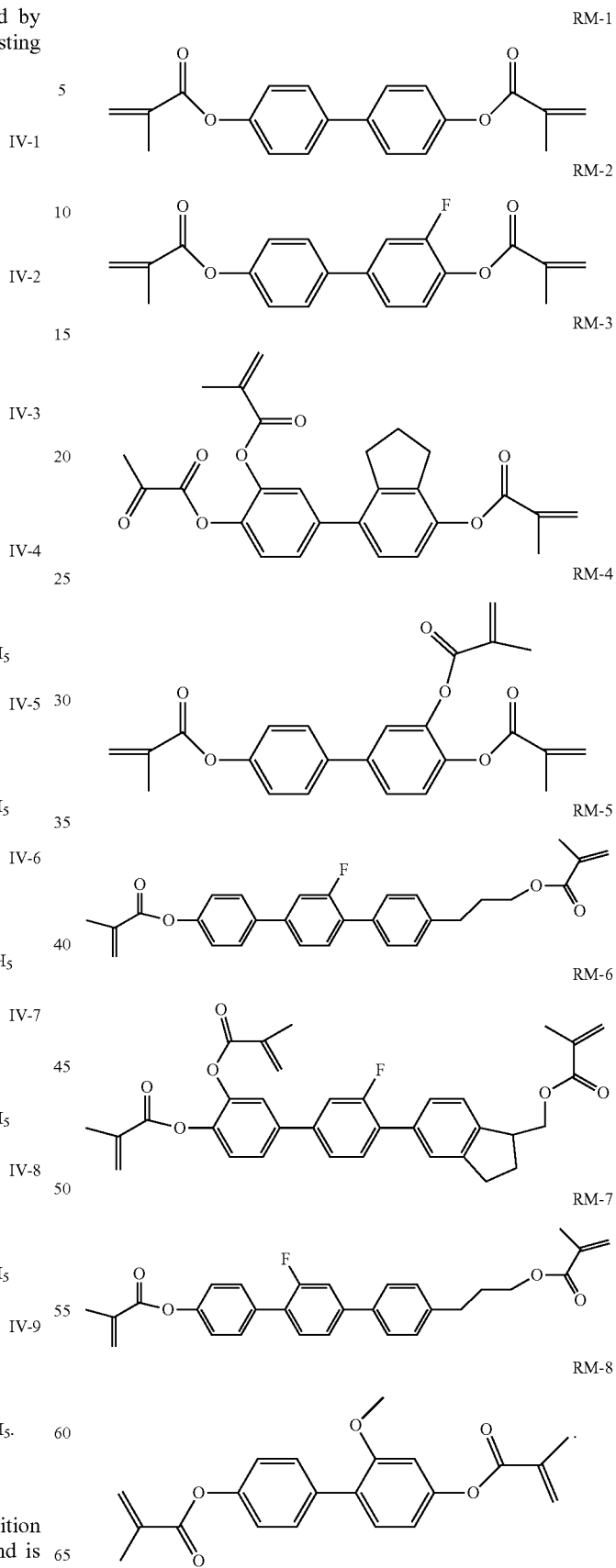

In the liquid crystal composition of the present disclosure, there is no special restriction on the contents of the compounds of the formula I, formula II, formula III, formula IV and polymerizable compound, and those skilled in the art can select the appropriate content of each component according to needs. Preferably, in the liquid crystal composition of the invention, the total mass content of the components other than polymerizable compounds is 100%, the mass content of the compounds represented by formula I in the liquid crystal composition is 1-10%, preferably 5-8%; the mass content of the compounds in the liquid crystal composition represented by formula II is 1-20%, preferably 15-20%; the total mass content of the compounds represented by formula III in the liquid crystal composition is 5-40%, preferably 16-25%; the total mass content of the compound represented by formula IV in the liquid crystal composition is 5-50%, preferably 10-40%; the polymerizable compound is added on the basis of the total mass of the remaining liquid crystal is 100%, and the added mass content of the polymerizable compound can be, for example 0.01-1%, preferably 0.03-0.2%.

In a further embodiment of the liquid crystal composition of the present disclosure, it is preferred that one or more compounds represented by formula V other than those of formula I and II are also included:

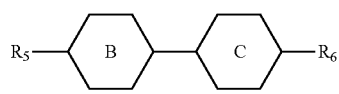

V wherein, $R_5$ and $R_6$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8, and any one —$CH_2$— or several —$CH_2$— that are not adjacent of the groups indicated by $R_5$ and $R_6$ are selectively substituted by cyclopentyl, cyclobutyl or cyclopropylene;

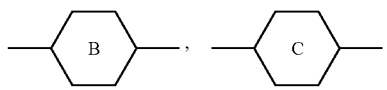

4-cyclohexylidene, 1,4-cyclohexene or 1,4-Phenylene.

Preferably, the compounds represented by formula V are selected from the group consisting of compounds represented by formulas V-1~V-6:

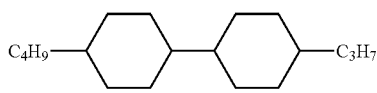

V-1

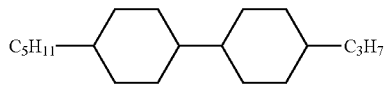

V-2

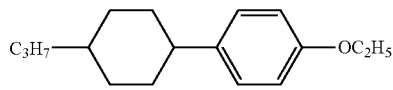

V-3

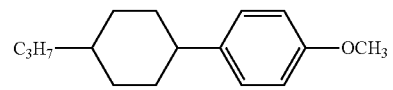

V-4

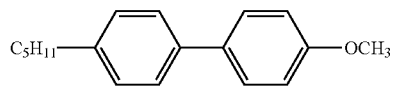

V-5

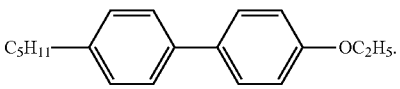

V-6

Preferably, the mass content of one or more compounds represented by formula V except for those in formula I and II is 0-20%, preferably 5-15%.

In a further embodiment of the liquid crystal composition of the present disclosure, preferably, one or more compounds represented by formula VI are also included:

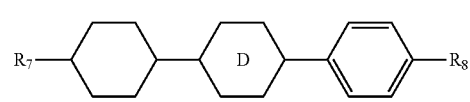

VI wherein, $R_7$ and $R_8$ independently represent alkyl group having a carbon atom number of 1-10, fluoro-substituted alkyl group having a carbon atom number of 1-10, alkoxy group having a carbon atom number of 1-10, fluoro-substituted alkoxy group having a carbon atom number of 1-10, alkenyl group having a carbon atom number of 2-10, fluoro-substituted alkenyl group having a carbon atom number of 2-10, alkenoxy group having a carbon atom number of 3-8 or fluoro-substituted alkenoxy group having a carbon atom number of 3-8, and any one —$CH_2$— or several —$CH_2$— that are not adjacent of the groups indicated by $R_7$ and $R_8$ are selectively substituted by cyclopentyl, cyclobutyl or cyclopropylene;

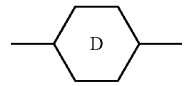

4-cyclohexylidene or 1,4-Phenylene.

Preferably, one or more compounds represented by formula VI are selected from the group consisting of compounds represented by formula VI-1~VI-8:

VI-1

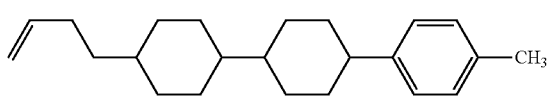

VI-2

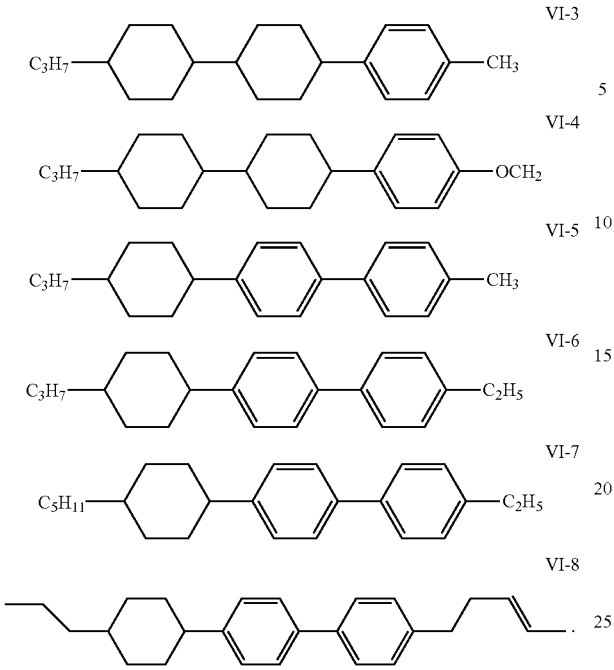

Preferably, the mass content of the compound represented by formula VI in the liquid crystal composition is 0-30%, preferably 5-25%;

In the liquid crystal composition of the present disclosure, dopants with various functions can be added. In the case of dopants, the content of dopants is preferably 0.01~1.5% in the liquid crystal composition. The dopants can be listed as antioxidants, ultraviolet absorbers and chiral agents.

Antioxidants can be listed,

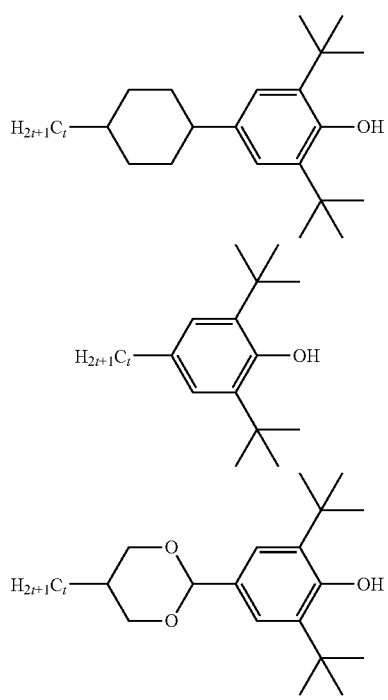

$t$ represents an integer from 1 to 10.
Chiral agents can be listed,

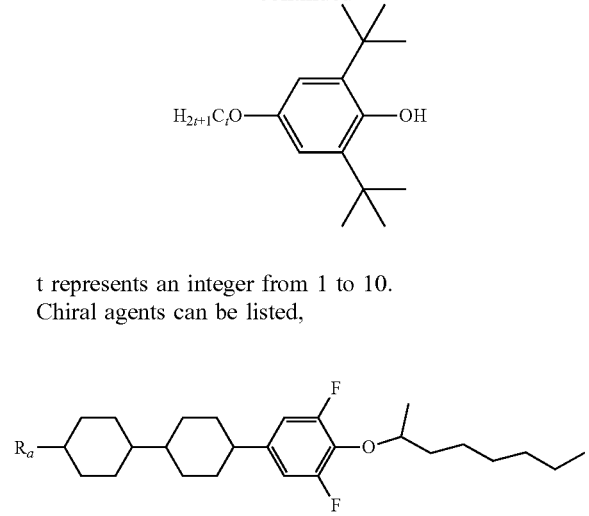

$R_a$ represents alkyl with carbon atom number of 1-10.
Light stabilizers can be listed,

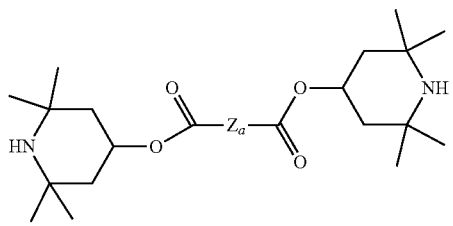

$Z_a$ represents alkylene having a carbon atom number of 1 to 20, in which any one or more hydrogen is selectively substituted by halogen, and any one or more —CH$_2$— is selectively substituted by —O—.

Ultraviolet absorbers can be listed,

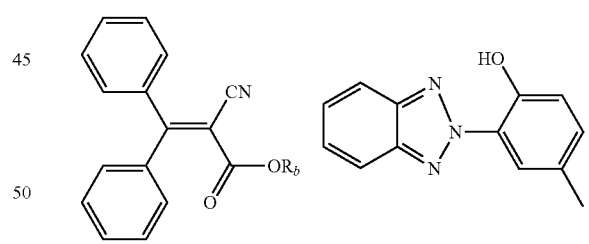

$R_b$ represents alkyl group having a carbon atom number of 1-10.

[Liquid Crystal Display Element or Liquid Crystal Display]

The present disclosure also relates to a liquid crystal display element or a liquid crystal display comprising any one of the above liquid crystal compositions; the display element or display is an active matrix display element or display or a passive matrix display element or display.

Preferably, the liquid crystal display element or liquid crystal display is preferably an active matrix liquid crystal display element or a liquid crystal display.

Preferably, the active matrix display element or display is a VA-TFT, IPS-TFT or FFS-TFT liquid crystal display element or display.

EMBODIMENTS

In order to explain the present disclosure more clearly, the present disclosure will be further explained in combination with the preferred embodiment. Those skilled in the art should understand that the contents described below are illustrative rather than restrictive, and the scope of protection of the present disclosure should not be limited.

In this manual, unless otherwise specified, the percentage refers to the mass percentage, and the temperature is degree centigrade (° C.). The specific meaning and test conditions of other symbols are as follows:

Cp is the clear point (° C.) of liquid crystal, and it is measured by DSC quantitative method;

An is the optical anisotropy, no is the refractive index of ordinary light, Ne is the refractive index of extraordinary light, the test conditions are 25±2° C., 589 nm, Abbe refractometer test;

$\Delta\varepsilon$ is the dielectric anisotropy, $\Delta\varepsilon=\varepsilon_{//}-\varepsilon_{\perp}$, where $\varepsilon_{//}$ is the dielectric constant parallel to the molecular axis, and $\varepsilon_{\perp}$ is the dielectric constant perpendicular to the molecular axis. The test conditions are 25±0.5° C., 20 um vertical box, INSTEC:ALCT-IR1 testing;

$\gamma_1$ is the rotational viscosity (mPa·s), and the test conditions are 25±0.5° C. and 20 um vertical box, INSTEC: ALCT-IR1 testing;

$K_{11}$ is the torsional elastic constant and $K_{33}$ is the unfolding elastic constant INSTEC:ALCT-IR1, 20 um vertical box;

The preparation method of the liquid crystal composition is as follows: each liquid crystal monomer is weighed according to a certain proportion and put into a stainless steel beaker; the stainless steel beaker containing each liquid crystal monomer is heated and melted on the magnetic stirring instrument; after most of the liquid crystal monomer in the stainless steel beaker is melted, a magnetic rotor is added into the stainless steel beaker, and the mixture is stirred evenly and cooled to room temperature to obtain liquid crystal composition.

The structure of liquid crystal monomer in the embodiment of the disclosure is represented by codes. The codes for ring structures, end groups and linking groups of liquid crystals are represented as in Tables 1 and 2 below.

TABLE 1

| Corresponding codes of ring structure | |
|---|---|
| Ring structure | Corresponding code |
|  | C |
| 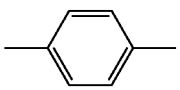 | P |
| 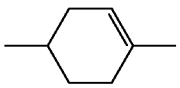 | L |
| 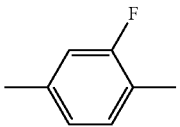 | G |

TABLE 1-continued

| Corresponding codes of ring structure | |
|---|---|
| Ring structure | Corresponding code |
| 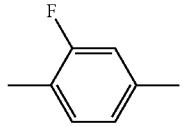 | Gi |
|  | Y |
| 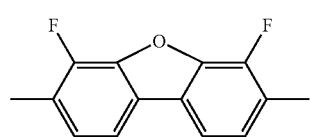 | Sb |
| 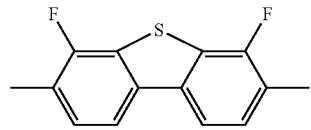 | Sc |

TABLE 2

| Corresponding codes of end group and linking group | |
|---|---|
| End group and linking group | Corresponding code |
| $C_nH_{2n+1}$— | n- |
| $C_nH_{2n+1}O$— | nO- |
| —$CF_3$ | -T |
| —$OCF_3$ | -OT |
| —$CH_2O$— | -O- |
| —F | -F |
| —$CH_2CH_2$— | -E- |
| —CH=CH— | -V- |
| —CH=CH—$C_nH_{2n+1}$ | Vn- |
| 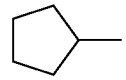 | Cp- |
| 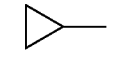 | Cpr- |
| 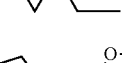 | Cpr1- |
| 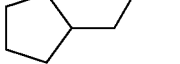 | CpO |
| 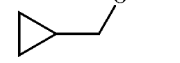 | CprO |

EXAMPLES

the code is CC-Cp-V1;

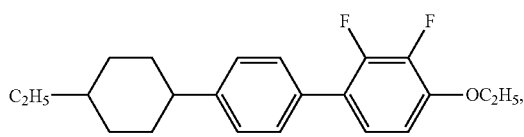 [SMILES: CCOc1ccc(-c2ccc(C3CCC(CC)CC3)cc2)c(F)c1F]

the code is CPY-2-O2;

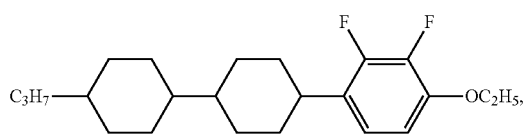

the code is CCY-3-O2;

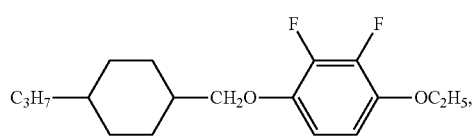

the code is COY-3-O2;

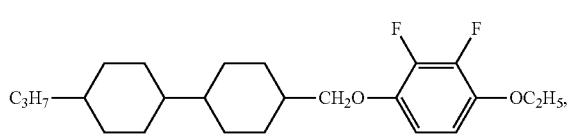

the code is CCOY-3-O2;

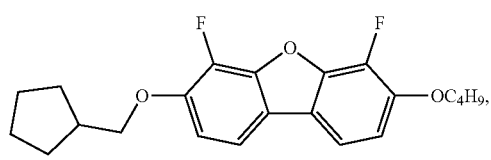

the code is Sb-CpO-O4;

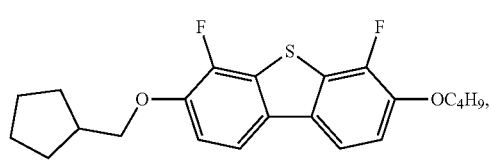

the code is Sc-CpO-O4.

Example 1

The formula and corresponding properties of the liquid crystal composition are shown in Table 3.

TABLE 3

Formula and corresponding properties of liquid crystal composition in example 1

| Category | Liquid crystal monomer code | Content (mass fraction) |
|---|---|---|
| I | CC-3-V | 6.5 |
| II | CC-2-3 | 15.5 |
| III | PY-3-O2 | 15 |
| III | PY-O2-O2 | 4.5 |
| IV | CY-3-O2 | 14 |
| IV | CCY-3-O2 | 7 |
| IV | CPY-2-O2 | 10 |
| IV | CPY-3-O2 | 2.5 |
| V | CC-5-3 | 6 |
| VI | CCP-V2-1 | 11.5 |
| VI | CPP-3-1 | 2 |
| VI | CPP-3-2V1 | 5.5 |
| RM | RM-3 | 0.15 |

$\Delta\varepsilon$[1 KHz, 25° C.]: −3.1
$\Delta n$[589 nm, 25° C.]: 0.107
Cp: 76° C.
$\gamma_1$: 74 mPa · s
$K_{11}$: 12.3
$K_{33}$: 14.2
$\gamma_1/K_{33}$: 5.2

Example 2

The formula and corresponding properties of the liquid crystal composition are shown in Table 4.

TABLE 4

Formula and corresponding properties of liquid crystal composition in example 2

| Catagory | Liquid crystal monomer code | Content (mass fraction) |
|---|---|---|
| I | CC-3-V | 8 |
| II | CC-2-3 | 15 |
| III | PY-3-O2 | 15 |
| III | PY-O2-O2 | 5 |
| IV | CY-3-O2 | 14 |
| IV | CCY-3-O2 | 10 |
| IV | CPY-2-O2 | 10 |
| V | CC-5-3 | 8 |
| VI | CCP-V2-1 | 3 |
| VI | CPP-3-1 | 10 |
| VI | CPP-3-2V1 | 2 |
| RM | RM-4 | 0.30 |

$\Delta\varepsilon$[1 KHz, 25° C.]: −3.2
$\Delta n$[589 nm, 25° C.]: 0.108
Cp: 75° C.
$\gamma_1$: 72 mPa · s
$K_{11}$: 13.0
$K_{33}$: 13.7
$\gamma_1/K_{33}$: 5.3

Example 3

The formula and corresponding properties of the liquid crystal composition are shown in Table 5.

TABLE 5

Formula and corresponding properties of liquid crystal composition in example 3

| Catagory | Liquid crystal monomer code | Content (mass fraction) |
|---|---|---|
| I | CC-3-V | 5 |
| II | CC-2-3 | 15 |
| III | PY-3-O2 | 15 |
| III | PY-O2-O2 | 5 |
| IV | CY-3-O2 | 14 |
| IV | CCY-3-O2 | 10 |
| IV | CCY-4-O2 | 10 |
| V | CC-5-3 | 4 |
| V | CP-3-O2 | 4 |
| VI | CCP-V2-1 | 10 |
| VI | CPP-3-2V1 | 8 |
| RM | RM-1 | 0.07 |

$\Delta\epsilon$[1 KHz, 25° C.]: −3.2
$\Delta n$[589 nm, 25° C.]: 0.101
Cp: 73° C.
$\gamma_1$: 75 mPa · s
$K_{11}$: 12.6
$K_{33}$: 13.7
$\gamma_1/K_{33}$: 5.5

Example 4

The formula and corresponding properties of the liquid crystal composition are shown in Table 6.

TABLE 6

Formula and corresponding properties of liquid crystal composition in example 4

| Catagory | Liquid crystal monomer code | Content (mass fraction) |
|---|---|---|
| I | CC-3-V | 7 |
| II | CC-2-3 | 18 |
| III | PY-3-O2 | 15 |
| III | PY-O2-O2 | 5 |
| III | PY-O2-O4 | 5 |
| IV | CY-3-O2 | 7 |
| IV | CCY-3-O2 | 10 |
| IV | CCY-4-O2 | 7 |
| V | CC-4-3 | 8 |
| VI | CCP-V2-1 | 10 |
| VI | CPP-3-1 | 8 |
| RM | RM-2 | 0.15 |

$\Delta\epsilon$[1 KHz, 25° C.]: −2.9
$\Delta n$[589 nm, 25° C.]: 0.100
Cp: 75° C.
$\gamma_1$: 76 mPa · s
$K_{11}$: 12.2
$K_{33}$: 13.7
$\gamma_1/K_{33}$: 5.5

Example 5

The formula and corresponding properties of the liquid crystal composition are shown in Table 7.

TABLE 7

Formula and corresponding properties of liquid crystal composition in example 5

| Catagory | Liquid crystal monomer code | Content (mass fraction) |
|---|---|---|
| I | CC-3-V | 7 |
| II | CC-2-3 | 18 |
| III | PY-3-O2 | 15 |
| III | PY-O2-O2 | 5 |
| III | PY-O2-O4 | 5 |
| IV | CY-3-O2 | 7 |
| IV | CCY-3-O2 | 10 |
| IV | CCY-4-O2 | 7 |
| V | CC-4-3 | 8 |
| VI | CCP-3-1 | 10 |
| VI | CPP-3-1 | 8 |
| RM | RM-2 | 0.15 |

$\Delta\epsilon$[1 KHz, 25° C.]: −2.9
$\Delta n$[589 nm, 25° C.]: 0.100
Cp: 77° C.
$\gamma_1$: 76 mPa · s
$K_{11}$: 12.2
$K_{33}$: 13.7
$\gamma_1/K_{33}$: 5.5

Example 6

The formula and corresponding properties of the liquid crystal composition are shown in Table 8.

TABLE 8

Formula and corresponding properties of liquid crystal composition in example 6

| Catagory | Liquid crystal monomer code | Content (mass fraction) |
|---|---|---|
| I | CC-3-V | 8 |
| II | CC-2-3 | 20 |
| III | PY-O2-O2 | 8 |
| III | PY-O2-O4 | 8 |
| IV | CY-3-O2 | 12 |
| IV | CPY-3-O2 | 8 |
| IV | CPY-2-O2 | 10 |
| V | CC-5-3 | 5 |
| V | CC-4-3 | 5 |
| VI | CPP-3-1 | 5 |
| VI | CCP-3-1 | 11 |
| RM | RM-2 | 0.3 |

$\Delta\epsilon$[1 KHz, 25° C.]: −2.9
$\Delta n$[589 nm, 25° C.]: 0.109
Cp: 76° C.
$\gamma_1$: 73 mPa · s
$K_{11}$: 13.2
$K_{33}$: 14.6
$\gamma_1/K_{33}$: 5.0

Example 7

The formula and corresponding properties of the liquid crystal composition are shown in Table 9 below.

TABLE 9

Formula and corresponding properties of liquid crystal composition in Example 7

| Catagory | Liquid crystal monomer code | Content (mass fraction) |
|---|---|---|
| I | CC-3-V | 6.5 |
| II | CC-2-3 | 18.5 |
| III | PY-O2-O2 | 8 |
| III | PY-O2-O4 | 8 |
| IV | CY-3-O2 | 12.5 |
| IV | CPY-3-O2 | 8 |
| IV | CPY-2-O2 | 10 |
| V | CP-3-O2 | 3 |
| V | CC-5-3 | 10 |
| VI | CPP-3-1 | 5 |
| VI | CCP-3-1 | 10.5 |
| RM | RM-4 | 0.25 |

$\Delta\varepsilon$[1 KHz, 25° C.]: −3.0
$\Delta n$[589 nm, 25° C.]: 0.107
Cp: 75° C.
$\gamma_1$: 74 mPa · s
$K_{11}$: 13.4
$K_{33}$: 14.7
$\gamma_1/K_{33}$: 5.0

Example 8

The formula and corresponding properties of the liquid crystal composition are shown in table 10 below.

TABLE 10

Formula and corresponding properties of liquid crystal composition in example 8

| Catagory | Liquid crystal monomer code | Content (mass fraction) |
|---|---|---|
| I | CC-3-V | 6.5 |
| II | CC-2-3 | 17.0 |
| III | PY-3-O2 | 8 |
| III | PY-O2-O4 | 8 |
| IV | CY-3-O2 | 14.5 |
| IV | CPY-3-O2 | 8 |
| IV | CCY-3-O2 | 10 |
| V | CP-3-O2 | 3 |
| V | CC-5-3 | 10 |
| VI | CPP-3-1 | 5.5 |
| VI | CPP-3-2V1 | 9.5 |
| RM | RM-4 | 0.25 |

$\Delta\varepsilon$[1 KHz, 25° C.]: −3.0
$\Delta n$[589 nm, 25° C.]: 0.106
Cp: 74° C.
$\gamma_1$: 74 mPa · s
$K_{11}$: 13.9
$K_{33}$: 14.3
$\gamma_1/K_{33}$: 5.2

Comparative Example 1

The formula and corresponding properties of the liquid crystal composition are shown in Table 11 below.

TABLE 11

Formula and corresponding properties of liquid crystal composition in comparative example 1

| Catagory | Liquid crystal monomer code | Content (mass fraction) |
|---|---|---|
| II | CC-2-3 | 15.5 |
| III | PY-3-O2 | 15 |
| III | PY-O2-O2 | 4.5 |
| IV | CY-3-O2 | 14 |
| IV | CPY-2-O2 | 10 |
| IV | CPY-3-O2 | 2.5 |
| V | CC-5-3 | 6 |
| VI | CCP-V2-1 | 11.5 |
| VI | CPP-3-1 | 2 |
| VI | CPP-3-2V1 | 5.5 |
|  | CC-5-V | 6.5 |
|  | CCOY-3-O2 | 7 |
| RM | RM-3 | 0.15 |

$\Delta\varepsilon$[1 KHz, 25° C.]: −3.1
$\Delta n$[589 nm, 25° C.]: 0.102
Cp: 76° C.
$\gamma_1$: 80 mPa · s
$K_{11}$: 12.0
$K_{33}$: 14.3
$\gamma_1/K_{33}$: 5.6

In example 1, CC-3-V is replaced with CC-5-V, CCY-3-O2 is replaced with CCOY-3-O2, and the rest is the same as that of example 1, as the comparative example 1. Compared with the comparative example 1, example 1 has lower rotational viscosity $\gamma_1$ and lower $\gamma_1/K_{33}$, which can obtain a fast response liquid crystal display.

Comparative Example 2

The formula and corresponding properties of the liquid crystal composition are shown in Table 12.

TABLE 12

Formula and corresponding properties of liquid crystal composition in comparative example 2

| Catagory | Liquid crystal monomer code | Content (mass fraction) |
|---|---|---|
| I | CC-3-V | 8 |
| II | CC-2-3 | 20 |
| III | PY-3-O2 | 8 |
| IV | CY-3-O2 | 10 |
| IV | CCY-3-O2 | 7 |
| IV | CPY-2-O2 | 10 |
| V | CC-5-3 | 9 |
| VI | CCP-V2-1 | 4 |
| VI | CPP-3-1 | 12 |
| VI | CPP-3-2V1 | 2 |
|  | Sb-CpO-O4 | 5 |
|  | Sc-CpO-O4 | 5 |
| RM | RM-4 | 0.30 |

$\Delta\varepsilon$[1 KHz, 25° C.]: −3.2
$\Delta n$[589 nm, 25° C.]: 0.104
Cp: 75° C.
$\gamma_1$: 80 mPa · s
$K_{11}$: 12.6
$K_{33}$: 12.9
$\gamma_1/K_{33}$: 6.2

PY-3-O2 and PY-O2-O2 in example 2 are replaced with Sb-CpO-O4 and Sc-CpO-O4, and the rest are the same as those in example 2, as the comparative example 2. Compared with the comparative example 2, example 2 has lower rotational viscosity $\gamma_1$ and lower $\gamma_1/K_{33}$, and can obtain a fast response liquid crystal display.

Comparative Example 3

The formula and corresponding properties of the liquid crystal composition are shown in table 13 below.

TABLE 13

Formula and corresponding properties of liquid crystal composition in comparative example 3

| Catagory | Liquid crystal monomer code | Content (mass fraction) |
| --- | --- | --- |
| I | CC-3-V | 8 |
| II | CC-2-3 | 20 |
| III | PY-O2-O2 | 8 |
| IV | CY-3-O2 | 8 |
| IV | CPY-3-O2 | 8 |
| IV | CPY-2-O2 | 10 |
| V | CC-5-3 | 7 |
| V | CC-4-3 | 5 |
| V | CP-3-O2 | 2 |
| VI | CPP-3-1 | 5 |
| VI | CCP-3-1 | 11 |
|  | Sb-CpO-O4 | 8 |
| RM | RM-2 | 0.3 |

Δε[1 KHz, 25° C.]: −3.0
Δn[589 nm, 25° C.]: 0.102
Cp: 76° C.
$\gamma_1$: 82 mPa · s
$K_{11}$: 13.5
$K_{33}$: 14.1
$\gamma_1/K_{33}$: 5.8

PY-O4-O2 in example 6 is replaced with Sb-CpO-O4, and the rest are the same as that of example 6, as the comparative example 3. Compared with the comparative example 3, example 6 has lower rotational viscosity $\gamma_1$ and lower $\gamma_1/K_{33}$, and can obtain a fast response liquid crystal display.

Comparative Example 4

The formula and corresponding properties of the liquid crystal composition are shown in table 14 below.

TABLE 14

Formula and corresponding properties of liquid crystal composition in comparative example 4

| Catagory | Liquid crystal monomer code | Content (mass fraction) |
| --- | --- | --- |
| II | CC-2-3 | 19.5 |
| III | PY-O2-O2 | 8 |
| IV | CY-3-O2 | 5.5 |
| IV | CPY-2-O2 | 11 |
| V | CP-3-O2 | 14.5 |
| V | CC-5-3 | 10 |

TABLE 14-continued

Formula and corresponding properties of liquid crystal composition in comparative example 4

| Catagory | Liquid crystal monomer code | Content (mass fraction) |
| --- | --- | --- |
| V | PP-5-1 | 2 |
| VI | CPP-3-1 | 5 |
| VI | CCP-3-1 | 11.5 |
|  | CCOY-3-O2 | 6 |
|  | Sc-CpO-O4 | 7 |
| RM | RM-4 | 0.25 |

Δε[1 KHz, 25° C.]: −3.0
Δn[589 nm, 25° C.]: 0.104
Cp: 75° C.
$\gamma_1$: 82 mPa · s
$K_{11}$: 14.1
$K_{33}$: 14.2
$\gamma_1/K_{33}$: 5.8

PY-O4-O2 and CPY-3-O2 in example 7 are replaced with Sc-CpO-O4 and CCOY-3-O2 respectively, and the rest are the same as those in example 7, as the comparative example 4. Compared with the comparative example 4, example 7 has lower rotational viscosity $\gamma_1$ and lower $\gamma_1/K_{33}$, and can obtain a fast response liquid crystal display.

Obviously, the above-mentioned examples of the present disclosure are only for the purpose of clearly explaining the examples of the present disclosure, rather than limiting the implementation mode of the present disclosure. For ordinary technical personnel in the art, other changes or changes in different forms can be made on the basis of the above description. Here, it is impossible to enumerate all the examples, and all the technologies belong to the present disclosure The obvious changes or changes in the technical scheme are still within the scope of protection of the present disclosure.

The invention claimed is:

1. A liquid crystal composition with negative dielectric anisotropy, wherein the liquid crystal composition comprises:
   a compound represented by formula I with a mass content of 1-10% as a first component;
   a compound represented by formula II with a mass content of 1-20% as a second component;
   two compounds represented by formula III as a third component;
   three compounds represented by formula IV as a fourth component; and,
   one or more polymerizable compounds as a fifth component,
   a compound represented by formula V-1 and a compound represented by formula V-2 as a sixth component,
   a compound represented by formula VI-3 and a compound represented by formula VI-5 as a seventh component,

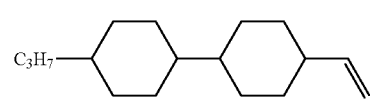

I

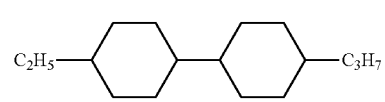

II

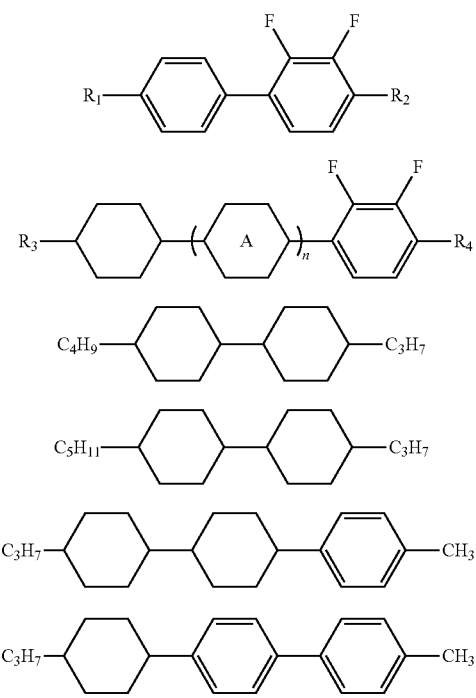

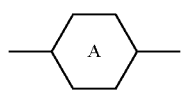

wherein,
$R_1$, $R_2$ independently represent alkoxy group having a carbon atom number of 2-4;
$R_3$ represent alkyl group having a carbon atom number of 2-5;
$R_4$ represent alkoxy group having a carbon atom number of 2;

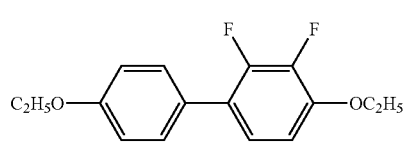

represents 1,4-Phenylene;
n represents 0 or 1;
a mass content of the two compounds represented by formula III is 16%, and a mass content of the three compounds represented by formula IV is 30-30.5%, a mass content of the sixth component is 10%, and a mass content of the seventh component is 16%.

2. The liquid crystal composition according to claim 1, wherein the mass content of the compound represented by formula I is 5-8%, and the mass content of the compound represented by formula II is 15-20%.

3. The liquid crystal composition according to claim 1, wherein the compounds represented by formula III are selected from the group consisting of compounds represented by formulas III-5, III-6 and III-7:

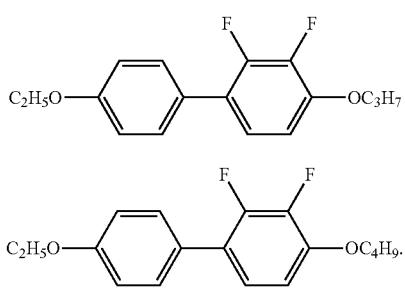

4. The liquid crystal composition according to claim 1, wherein the compounds represented by formula IV are selected from the group consisting of compounds represented by formulas IV-1, IV-2, IV-3, IV-7, IV-8 and IV-9:

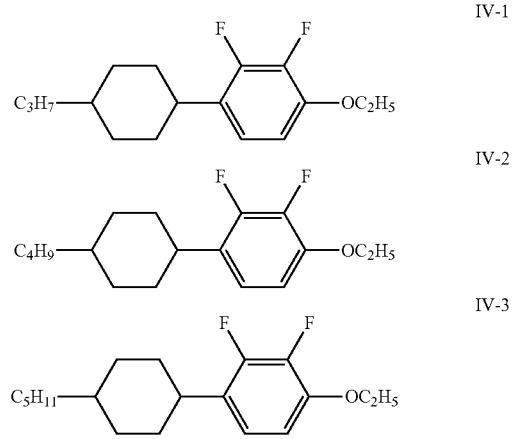

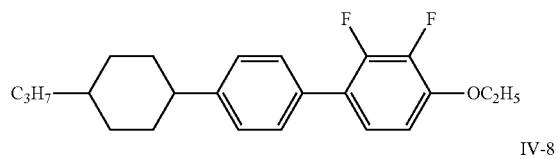

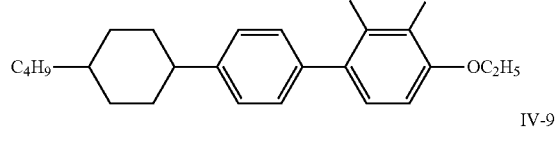

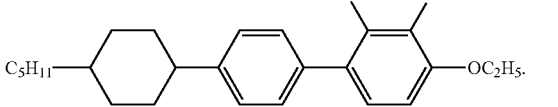

5. A liquid crystal display element or liquid crystal display, comprising the liquid crystal composition according to claim 1, said liquid crystal display element or liquid crystal display being an active matrix addressing display element or display, or a passive matrix addressing display element or display.

* * * * *